Jan. 27, 1970     A. D. FRIEND     3,492,556
CONTROL SYSTEM FOR ELECTRICALLY POWERED VEHICLES
Filed Feb. 23, 1967     2 Sheets-Sheet 1

INVENTOR
Aaron D. Friend
BY
Wm T Wofford
ATTORNEY

United States Patent Office 3,492,556
Patented Jan. 27, 1970

3,492,556
CONTROL SYSTEM FOR ELECTRICALLY POWERED VEHICLES
Aaron D. Friend, Gretna, La., assignor to R. G. LeTourneau Inc., Longview, Tex.
Filed Feb. 23, 1967, Ser. No. 618,062
Int. Cl. H02p 5/20
U.S. Cl. 318—149                6 Claims

ABSTRACT OF THE DISCLOSURE

Control system for electrically powered vehicles, typically heavy duty off-road type work vehicles having electric motor driven wheels. In embodiment shown, power is supplied from generators driven by internal combustion engines. Motor excitation and generator excitation are varied responsive to a plurality of sensed and inter-related vehicle operating conditions including generator output voltage, wheel motor speed, and main controller setting. Simplified resistance grid control arrangement suitable for vehicles to be primarily operated in only one direction, is provided.

---

Figure 1:
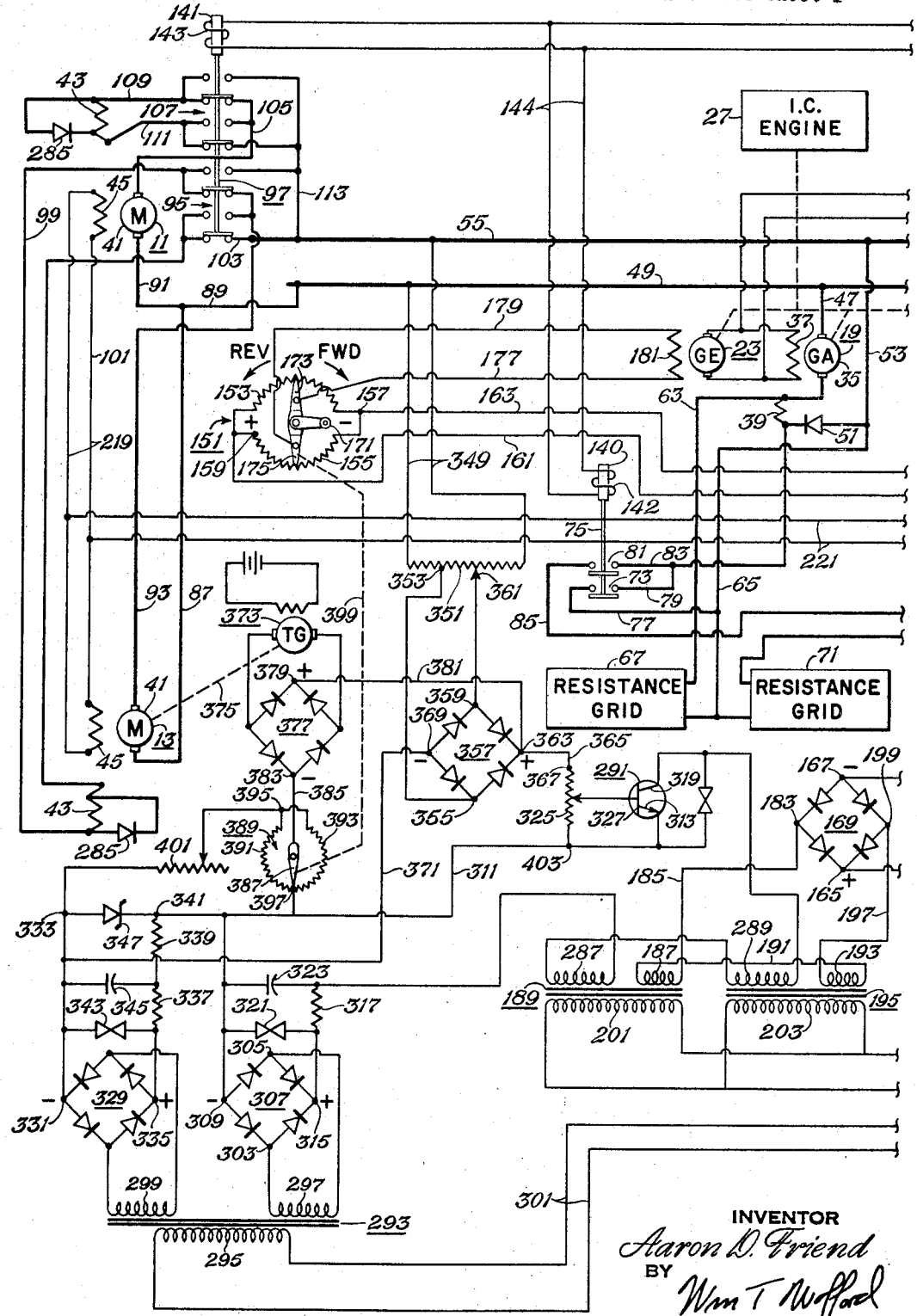

The present invention relates to control systems for electrically powered vehicles, and more particularly to systems, apparatus and arrangements for controlling vehicles wherein the vehicle wheels are driven by electric motors which are supplied power from one or more generators, which in turn are powered by one or more internal combustion engines.

Many types of control systems have been devised in the prior art which I am aware, for various applications involving vehicles driven by electric traction motors supplied from internal combustion engine driven generators, a notable example being diesel-electric trains. However, the particular type of application with which my invention is primarily concerned, though quite old in general concept, is really quite new insofar as actual practice is concerned. This general concept is that of the heavy duty type self-propelled rubber tired off-road vehicle and/or mobile self-propelled work performing machine. Machines of this general class include by way of example off-road transport vehicles, earthmoving and earthworking machines, such as scrapers, dozers, tractors and haulers, land clearing machines, logging machines, mobile cranes, and the like. It is only recently that such machines have been electrically powered to a practical commercial extent; that is, having an internal combustion engine or engines driving a generator or generators to supply electrical power to vehicle wheel motors as well as to the other functions of the machine. The requirements for the electrical systems of such machines are quite severe. The electrical system of such machines must cope with wheel motor load and speed changes that are quite rapid and extend over a wide range. Further, it is very important that such machines have an effective dynamic braking system, since the braking demands are much too severe for friction brakes alone.

U.S. Patent No. 3,102,219 and copending application U.S. Ser. No. 488,981, filed Sept. 21, 1965, now U.S. Patent 3,417,304 disclose control systems for electrically powered vehicles of the type hereinabove referred to. The present invention is concerned with improvements to such control systems, particularly as to performance under overspeed, dynamic braking, and reversing conditions, and including systems wherein the vehicle drive motors may receive their power from a plurality of generators.

Another vehicle device to which the present invention is particularly applicable is the heavy duty crane or hoist. It is to be understood that the term "vehicle" as used herein includes other vehicles to which the present invention is applicable, in addition to the wheeled vehicles that are discussed herein with reference to the description of a preferred embodiment of the present invention.

Accordingly, the general object of the present invention is to provide improved control apparatus, systems, and arrangement for vehicles of the general class abovementioned.

More specifically, it is an object of the present invention to provide control apparatus, systems, and arrangements which will result in improved performance under overspeed and dynamic braking conditions, for vehicles of the general class above-mentioned.

Another object of the present invention is to provide control apparatus, systems, and arrangements which will result in improved generator voltage control for vehicles of the general class above-mentioned.

Another object of the present invention is to provide control apparatus, systems, and arrangements which will result in improved vehicle governed speed control for vehicles of the general class above-mentioned.

Another object of the present invention is to provide improved running to dynamic braking and vice versa control arrangements for vehicles of the general class above-mentioned.

Another object of the present invention is to provide improved control apparatus, systems, and arrangements for controlling the shunt field excitation of the generator or generators of vehicles of the general class above-mentioned.

Another object of the present invention is to provide improved control apparatus, systems, and arrangements for controlling the shunt field excitation of the drive motors of vehicles of the general class above-mentioned.

Another object of the present invention is to provide improved control apparatus, systems, and arrangements for the parallel operation of the generators of vehicles of the general class above-mentioned, under forward and reverse conditions.

Figure 1A:
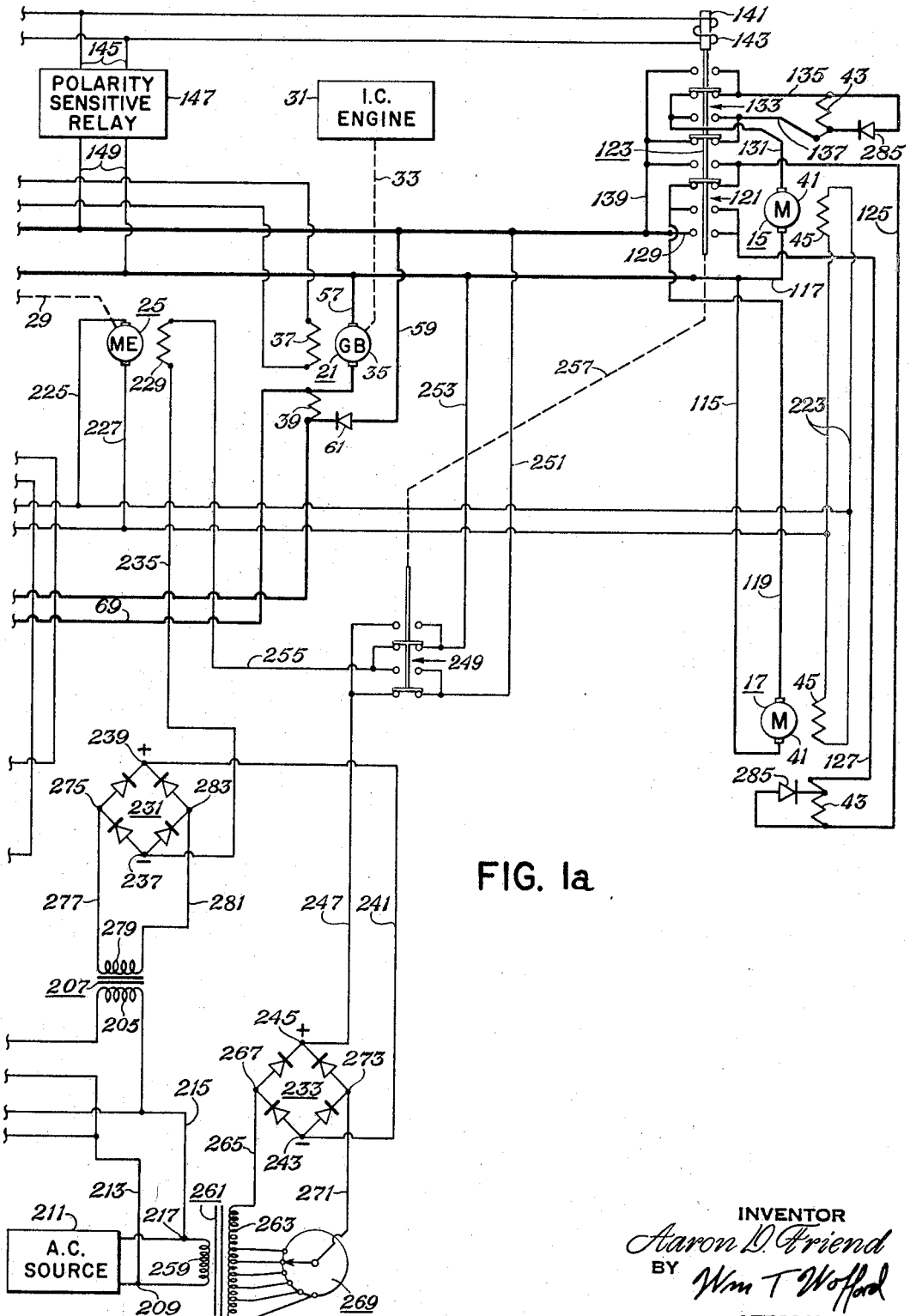

These and other objects are effected by this invention, as will be apparent from the following description taken in accordance with the accompanying drawings, forming a part of this application, in which:

FIG. 1 and FIG. 1a is a schematic circuit diagram showing apparatus, control systems and arrangements in accordance with a preferred embodiment of the invention.

Referring now to the drawings, there are shown four direct current traction or drive motors 11, 13, 15, 17. These motors are incorporated into self-contained vehicle wheel drive units. Such wheel drive units include a gear reduction built into the wheel structure, with the traction motor driving the gear reduction. The wheel drive units are then mounted to the vehicle axles. For details of such wheel drive units (sometimes referred to as "electric wheels") reference is made to U.S. Patent No. 2,726,726. For purposes of discussion herein, the wheeled vehicle of the illustrated preferred embodiment will be assumed to have four wheels, each of which is an "electric wheel." It should be understood, however, that the present invention is applicable also to wheeled vehicles having either less than or more than four "electric wheels," as well as to pertinent vehicles that are not "wheeled," for example, hoists.

Also shown in the drawings are two direct current generators 19, 21. The generator 19 will hereinafter be referred to as generator A, and the generator 21 will hereinafter be referred to as generator B. Also shown in the drawings are a generator exciter 23, and a motor exciter 25, which are driven, along with generator A, via conventional mechanical linkages indicated by the dotted lines 29, by an internal combustion engine (shown as a block 27, and which will hereinafter be called internal combustion engine A). Generator B is driven by a second internal combustion engine (shown as block 31, and which will hereinafter be called internal combustion engine B) via a conventional mechanical linkage indicated by the dotted line 33. While two generators and engines are shown, the present invention is also applicable in cases where more than two engine-generator sets are used, and in some of its aspects, to cases where only one engine-generator set is used. The present invention is also applicable in some of its aspects, to vehicles wherein the prime mover power source is other than an internal combustion engine, as for example, a turbine, or an electric motor. The generators 19, 21 are preferably of the differential compound type, each having an armature 35, a shunt field winding 37, and a series field winding 39, and output terminals. Each direct current traction motor is preferably of the cumulative compound type, having an armature 41, a series field winding 43, and a shunt field winding 45 and input terminals.

One side of the armature 35 of generator A is connected via lead 47 to a first main line bus 49, while the other side of the armature 35 of generator A is connected in series with the generator series field winding 39 and a diode 51 and via lead 53 to a second main line bus 55. The diode 51 is poled to conduct in the direction away from bus 55. One side of the armature 35 of generator B is connected via lead 57 to the first main line bus 49, while the other side of the armature 35 of generator B is connected via lead 59 in series with the generator series field winding 39 and a diode 61 to the second main line bus 55. The diode 61 is poled to conduct in the direction away from bus 55.

The series field 39 of generator A and diode 51 are connected via leads 63, 65 in series with a first energy dissipating resistance grid shown as block 67, while the series field 39 of generator B and diode 61 are connected via lead 69, leads 65, 53, bus 55 and lead 59 in series with a second energy dissipating resistance grid shown as a block 71. First normally open contacts 73 of a shunting relay 75 are connected via leads 77, 79 in shunt with the diode 51, while second normally open contacts 81 of the shunting relay 75 are connected via leads 83, 85 in shunt with the diode 61.

The left front wheel motor 13 has one side of its armature 41 connected via leads 87, 89 to the first main line bus 49, and the right front wheel motor 11 has a corresponding side of its armature 41 connected via leads 91, 89 to the first main line bus 49. The left front wheel motor 13 has the other side of its armature 41 connected via lead 93 to a first set of contacts 95 of a first reversing relay 97, via lead 99, in series with the motor series field winding 43, and via leads 101, 103 to the second main line bus 55. The right front wheel motor 11 has the other side of its armature 41 connected via lead 105 to a second set of contacts 107 of the first reversing relay 97, via lead 109 in series with the motor series winding 43, and via leads 111, 113 to the second main line bus 55.

The left rear wheel motor 17 has one side of its armature 41 connected via lead 115 to the first main line bus 49, and the right rear wheel motor 15 has a corresponding side of its armature 41 connected via lead 117 to the first main line bus 49. The other side of the armature 41 of the left rear wheel motor 17 is connected via lead 119 to a first set of reversing contacts 121 of a second reversing relay 123, via lead 125, in series with the motor series field winding 43, and via leads 127, 129, the second main line bus 55. The right rear wheel motor 15 has the other side of its armature 41 connected via lead 131 to a second set of contacts 133 of the second reversing relay 123, and via lead 135 in series with the motor series winding 43, and via leads 137, 139 to the second main line bus 55. In brief, the front wheel motors 11, 13, the rear wheel motors 15, 17, and the output terminals of generator A and generator B are all connected in parallel across main line buses 49, 55. Further, the series field windings 43 of all of the wheel motors are arranged to be reversed by action of the respective first and second reversing relays 97, 123.

Each of the first and second reversing relays 97, 123 has a respective armature 141, which is mechanically linked to the respective contact sets 95, 107, 121, 133. Each contact set is in effect a double pole double throw reversing switch, with the respective series field winding 43 connected across the center poles. Each reversing relay armature 141 has a respective operating coil 143. The operating coils 143 are connected in parallel and via leads 145 to the output terminals of a polarity sensitive relay (shown as a block 147), the input terminals of which are connected via leads 149 across the main line buses 49, 55. The polarity sensitive relay 147 may be of any suitable type, the requisite characteristics and function of which will be hereinafter explained. The shunting relay 75 has an armature 140 and an energizing coil 142 which is connected via leads 144 and leads 145 to the output terminals of the polarity sensitive relay 147.

The controller for the vehicle is a potentiometer 151 which is arranged to have a voltage output which is continuously variable from 0 up to a predetermined magnitude, both positive and negative. The controller potentiometer 151 is made up of a first resistance segment 153 and an oppositely disposed second resistance segment 155. The first and second resistance segments 153, 155 are connected in parallel to a pair of input terminals 157, 159. The input terminals 157, 159 are also connected via leads 161, 163 to the respective output terminals 165, 167 of a first rectifier bridge 169. The controller potentiometer 151 has a control handle 171 which moves a pair of diametrically opposed slider contacts 173, 175 along the respective resistance segments 153, 155. The controller output voltage is taken from the slider contacts 173, 175 which are connected via leads 177, 179 in series with the shunt field winding 181 of the generator exciter 23.

The input circuit for the first rectifier bridge 169 may be traced from input terminal 183 via lead 185 in series with the secondary winding 187 of a first saturable reactor 189 and via lead 191 in series with the secondary winding 193 of a second saturable reactor 195 and via lead 197 to the other input terminal 199. Each saturable reactor 189, 195 has a single respective primary winding 201, 203, and these primary windings are connected in parallel with each other and in series with the primary winding 205 of a first transformer 207. This circuit may be traced from one output termial 209 of a source of regulated alternating current voltage shown as a block 211, via lead 213 in series with the parallel combination of windings 201, 203 and in series with winding 205 and via lead 215 to the other output terminal 217 of the source 211.

The motor shunt fields 45 are all connected in parallel via leads 219, 221, 223, and via leads 225, 227 across the armature output terminals of the motor exciter 25. The motor exciter 25 has a shunt field winding 229 which is controlled by a voltage that is the resultant of the series combination of the output voltage of a second rectifier bridge 231 and the output voltage of a third rectifier bridge 233 and the main line bus voltage. The circuit of the motor exciter shunt field winding 229 may be traced from one of its terminals via lead 235 to one output terminal 237 of the second rectifier bridge 231 and from its other output terminal 239 via lead 241 to one output terminal 243 of the third rectifier bridge 233 and from its other output terminal 245 via lead 247 to a third set of contacts 249 of the second reversing relay 123, via lead 251 to the second main line bus 55, and from the first main line bus 49 via leads 253, 255 to the other terminal of the motor exciter shunt field winding 229. The third set of contacts 249 of the second reversing relay 123 are mechanically linked to its armature 141, as indicated by the dotted line 257.

The set of reversing relay contacts 249 amounts to a double pole double throw switch having its center poles connected respectively via leads 251, 253 across the main line buses 55, 49. The alternating current voltage source 211 has its output terminals 217, 209 connected to the primary winding 259 of a third transformer 261 which has a tapped secondary winding 263. One end of the secondary winding 263 is connected via lead 265 to one input terminal 267 of the third rectifier bridge 233. The taps of the secondary winding 263 are connected to the input terminals of a tap switch 269, the selector control of which is connected via lead 271 to the other input terminal 273 of the third rectifier bridge 233. The second rectifier bridge 231 has one input terminal 275 connected via lead 277 in series with the secondary winding 279 of the first transformer 207 and via lead 281 to its other input terminal 283.

Each vehicle traction motor series field winding 43 has a rectifier 285 connected in shunt with a major portion of the winding turns. The rectifiers 285 are poled such that under normal vehicle drive conditions they are non-conductive so that current flows through all of the turns of the series field winding 43.

The first and second saturable reactors 189, 195 have respective first saturating windings 287, 289. The flow of current through these first saturating windings is governed by a transistor 291 which acts as an amplifier. The power for the transistor amplifier 291 is supplied from the A.C. source 211 via a third transformer 293 having a primary winding 295 and first and second secondary windings 297, 299. The primary winding 295 is connected via leads 301 to the output terminals 209, 217 and the A.C. source 211. The first secondary winding 297 is connected to the input terminals 303, 305 of a fourth rectifier bridge 307. One output terminal 309 of the bridge 307 is connected via lead 311 to the emitter 313 of the transistor 291. The other output terminal 315 of the bridge 307 is connected in series with a filter resistor 317 and the first saturating windings 287, 289 of the first and second saturable reactors 189, 195 to the collector 319 of the transistor 291. A device 321 known as a "Thyrector" is connected across the output terminals 309, 315 of the bridge 307. The "Thyrector" is a surge protector device which may consist essentially of two selenium rectifiers connected back-to-back, and will allow high voltage peaks to pass but will block lower voltages. A filter capacitor 323 is connected between the bridge output terminal 309 and the terminal of the resistor 317 that is remote from the bridge ouput terminal 315.

The amplifying action of the transistor 291 is governed by the input voltage applied to a second potentiometer 325, the output voltage of which is applied between the emitter 313 and base 327 of the transistor 291. This input voltage is a resultant voltage derived from several sources and controls. These sources and controls will, for convenience of description, be herein referred to as the reference voltage source, main bus voltage source, the tachometer generator voltage source, the main bus source potentiometer control, the auxiliary controller potentiometer control, and the reference voltage source variable resistor control.

The reference voltage is derived from the A.C. source 211 via the second secondary winding 299 of the third transformer 293. The second secondary winding 299 is connected across the input terminals of a fifth rectifier bridge 329. A first output terminal 331 of the fifth bridge 329 is common to a first terminal 333 of the reference voltage source, while a second output terminal 335 of the fifth bridge 329 is connected in series with a filter resistor 337 and a regulating resistor 339 to a second output terminal 341 of the reference voltage source. A "Thyrector" 343 is connected across the output terminals 331, 335 of the fifth bridge 329, and a filter capacitor 345 is connected between the first output terminal 331 and the junction of the resistors 337, 339. A Zener diode 347 is connected across the output terminals 333, 341 of the reference voltage source.

The main bus voltage source is derived from the voltage across the main buses 49, 55 (which is also the output voltage of the generators A and B) via leads 349 which are connected in series with the total resistance of main bus source potentiometer control 351. A fixed tap 353 on the resistance of the control is connected to one input terminal 355 of a sixth rectifier bridge 357 the other input terminal 359 of which is connected to a slider contact 361 on the resistance of the control 351. A first output terminal 363 of the sixth bridge is connected via lead 365 to a first input terminal 367 of the second potentiometer 325. A second output terminal 369 of the sixth bridge 357 is connected via lead 371 to the first terminal 333 of the reference voltage source.

The tachometer generator voltage source is derived from a tachometer generator 373 which is mechanically coupled, as indicated by dotted line 375, to the ouput shaft of a wheel motor 13, so as to generate a voltage which is a function of the wheel motor speed. The output of the tachometer generator 373 is connected to the input terminals of a seventh rectifier bridge 377. The seventh bridge 377 has a first output terminal 379 connected via lead 381 to the first input terminal 367 of the second potentiometer 325. A second output terminal 383 of the seventh bridge 377 is connected via lead 385 to the movable contact 387 of the auxiliary controller potentiometer control 389 (hereinafter called the auxiliary potentiometer).

The auxiliary potentiometer 389 has two equal resistance segments 391, 393 connected in parallel across first and second input terminals 395, 397. The movable contact 387 is mechanically coupled, as indicated by the dotted line 399, to the slider contacts 173, 175 of the controller potentiometer 151. The first input terminal 395 of the auxiliary potentiometer 389 is connected in series with a reference voltage source variable resistor control 401 hereinafter sometimes called the reference voltage variable resistor to the first terminal 333 of the reference voltage source. The second input terminal 397 of the auxiliary potentiometer 389 is connected to a second input terminal 403 of the second potentiometer 325.

Operation of the electrically powered vehicle control system in accordance with my invention will now be explained. The positions of the controls as shown by the drawings represent the condition wherein the vehicle is parked and ready for movement in the forward direction. The electric wheel motors of the vehicle are preferably provided with electromagnetic friction brakes (not shown) of a type which may be set or released by the vehicle operator as desired, and particularly for parking the vehicle.

Assuming that the internal combustion engines 27, 31 are running, and that it is desired to move the vehicle forward, it is only necessary to move the controller potentiometer 151 away from its neutral position (assume clockwise movement for forward vehicle motion). A direct current voltage of proper polarity and derived from the first rectifier bridge 169 will immediately be applied to the field 181 of the generator exciter 23 which in turn will cause the generator exciter to supply direct current voltage of proper polarity to the shunt fields 37 of generator A and generator B, whereupon the output voltage of generators A and B will appear across main line buses 49, 55. For convenience, it is assumed that the second main line bus 55 will be positive and the first main line bus 49 will be negative for vehicle forward motion. At this stage, the output voltage of generators A and B is applied to the armatures 41 of the wheel motors 11, 13, 15, 17.

The wheel motor shunt fields 45, are supplied direct current voltage from the output of the motor exciter 25. The motor exciter shunt field 229 is controlled by a resultant direct current voltage which is the algebraic sum of three serially connected voltages, namely, the main line bus voltage supplied via the contacts 249 of the second reversing relay 123, the output voltage of the third rectifier bridge 233, and the output voltage of the second rectifier bridge 231. For additional details of the motor excitation control system, reference is made to U.S. Patent No 3,093,780. Under normal vehicle driving conditions, the rectifier bridge 231 performs the same function as rectifier bridge 233, that is, between them, they supply a direct current voltage which is always in bucking relation to the main line bus voltage.

Thus, with armature voltage and shunt field excitation applied to the wheel motors, the vehicle will move forward. In the normal vehicle drive condition, generator A and generator B have their outputs connected in parallel across the main line buses and their armature currents will flow through their respective series fields 39 and diodes 51, 61. To stop the vehicle forward motion, it is only necessary to return the controller 151 to its neutral position.

To move the vehicle in the reverse direction, it is only necessary to move the controller 151 counterclockwise away from its neutral position. This will cause voltage of opposite polarity to be applied to the generator exciter 23, which in turn will apply a voltage of opposite polarity to the shunt fields 37 of generator A and generator B, causing the output voltages of the generators to reverse their polarity. The vehicle can of course go to the reverse direction of operation from a standstill, but can also just as readily go from forward operation to reverse operation and vice versa. In other words, the controller 151 can be moved from a clockwise (forward) position through neutral and to a counterclockwise (reverse) position, or vice versa, and such action is a normal operation. The position of the motor reversing relays 97, 123 is determined by the polarity of the main line bus voltage. When the polarity of main line bus 55 is positive, the relays 97, 123 are in the position shown and the vehicle is set up for forward motion. When the polarity of main line bus 55 is negative, the relays 97, 123 are energized to the reverse position and the vehicle, of course, is then set up for reverse motion.

The device which controls the actuation of the motor reversing relays 97, 123 is the polarity sensitive relay 147. This polarity sensitive relay detects the polarity of the main line buses and actuates the motor reversing relays 97, 123 accordingly. The polarity sensitive relay 147 is designed to operate at very low levels of input voltage. In other words, when there is a change of polarity of the main line bus voltage, the polarity sensitive relay will detect the polarity change and actuate the motor reversing relays while the main line bus voltage is at a very low level. This means, of course, that the motor reversing relay switching is done at very low voltage levels. Since devices which are capable of performing the function of the polarity sensitive relay 147 are well known to those skilled in the art, details of a polarity sensitive relay per se are not shown or described herein.

Assume that the vehicle has been traveling in the forward direction and the controller 151 is moved counterclockwise through and beyond the neutral position. Immediately when the main line bus reverses polarity, the polarity sensitive relay 147 energizes the coils 143 of the motor reversing relays 97, 123 and the contacts of those relays are actuated to reverse position. This action, via contact sets 95, 107, 133, 121 reverses the series fields 43 of the respective wheel motors 11, 13, 15, 17. Also, via contact set 249, the input voltage from the main line buses which bucks the rectified alternating current voltage (from bridge rectifiers 231, 233) in the motor exciter field circuit is simultaneously reversed. Both the polarity of the shunt fields 37 of generator A and generator B and the direction of current in their armatures have been reversed. Also, shunting relay 75 will have been energized by the polarity sensitive relay output and will have closed its contacts 73, 81 to shunt the diodes 51, 61. Since the polarity of the motor shunt fields 45 has not changed, but the direction of motor armature current is reversed, and the motor series fields 43 have been reversed, the wheel motors are still cumulative compound and act in exactly the same manner as for forward operation.

For a further understanding of the present invention, it should be noted that saturable reactors 201, 203 have their primary windings connected in series with the primary winding of the first transformer 207; that the output of the saturable reactor secondary windings 187, 193 determines the voltage available at the controller potentiometer 151 and consequently affects the generator excitation; and that the output of the first transformer secondary winding 279 determines the output voltage of the second rectifier 231 and consequently affects the motor excitation. The input to the saturating windings 191, 287 is partially governed by the output of the transistor amplifier 291, and this input affects the impedance of the saturable reactor primary windings. When the output of the transistor amplifier 291 increases, the impedance of the saturable reactor primary windings decreases, resulting in a decrease in the output voltage of the first rectifier and a decrease in generator excitation. At the same time, the output voltage of the second rectifier 231 will increase, resulting in an increase in motor shunt field excitation.

As hereinbefore mentioned, the output of the transistor amplifier 291 is governed by the input voltage and slider setting of the second potentiometer. This input voltage is a resultant voltage derived from several sources and controls, namely the reference voltage source (output appearing at terminals 333, 341), the main bus voltage source (output of sixth rectifier), the tachometer generator voltage source (output of seventh rectifier), the main bus source potentiometer control 361, the auxiliary controller potentiometer control 389, the reference voltage source variable resistor control 401.

It is highly desirable that the generator output voltage should not exceed an essentially constant predetermined optimum value under all operating conditions. With constant excitation, it would be normal for the generator voltage to rise when load is decreased, and fall when load is increased. Ideally, a control system should provide ample excitation to assure optimum (usually maximum) generator output voltage for the heaviest load conditions without the fear that this voltage will be greatly exceeded when the load is suddenly and significantly decreased. The control system of the present invention provides improved generator output voltage control which approaches the ideal.

It is also highly desirable that the vehicle speed should be governed so that under all conditions a given setting of the controller potentiometer will result in a given vehicle speed, and that the vehicle wheel motors should not at any time exceed a predetermined maximum speed. The control system of the present invention provides improved vehicle governed speed control and maximum wheel motor speed control which approach the ideal.

It may be noted that the output of the sixth rectifier 357 is connected in series bucking relation to the output of the reference voltage source (terminals 333, 341) in series with the second potentiometer 325. The potentiometer control 361 is set so that the output voltage of the sixh rectifier equals that of the reference voltage source when the no load generator voltage is at the optimum (usually maximum) value.

It should also be noted that auxiliary controller potentiometer 389 is connected in series with the variable resistor 401 and the reference voltage source output (terminals 333, 341), and that the tachometer generator output voltage (seventh rectifier 377) is connected in series with that portion of the auxiliary controller potentiometer 389 determined by the position of its movable contact 387, and the input of the second potentiomeer 325, with the seventh rectifier output voltage being in bucking relation to the reference source voltage.

The vehicle wheel motor speed at which the tachometer generator control becomes effective is partly determined by the setting of variable resistor 401. The variable resistor 401 may be regarded as the wheel motor maximum speed limit control, since its setting determines the wheel motor maximum speed when the full resistance of the auxiliary controller potentiometer 389 is in (at the maximum voltage output position of the main controller potentiometer 151). The auxiliary controller 389 is set at the neutral position when the main controller 151 is at its zero voltage position.

The transistor amplifier output will always be controlled by either the resultant of the sixth rectifier output voltage (from main line bus source) and the reference voltage or the seventh rectifier output voltage (from tachometer generator) and a portion of the reference voltage.

Assume that the vehicle is running forward on level ground with the main controller 151 set at the half voltage position. Then the auxiliary controller would be automatically set at its half voltage position, and the vehicle will maintain a regulated or governed speed of half maximum speed. As the vehicle tends to exceed the governed speed due to excess available generator excitation, the output voltage of the seventh rectifier 377 will exceed its reference voltage, causing conduction of the transistor amplifier 291 to effect a reduction in vehicle speed.

Now assume that the vehicle starts going down hill. This will decrease the generator load, causing generator output voltage to increase, resulting in an immediate increase in the output voltage of the sixth rectifier 357. This however, will have no effect on the transistor amplifier, since the generator output voltage would be far below the maximum optimum value, and must tend to exceed the maximum optimum value before the output of the sixth rectifier can have any control effect. However, in addition, the vehicle wheel motors will tend to speed up, resulting in increased output voltage for the seventh rectifier 377. Since the wheel motors are now tending to exceed the governed speed determined by the setting of the main controller 151 and consequently the setting of the auxiliary controller 389, the output voltage of the seventh rectifier will exceed the bucking reference voltage, causing the transistor amplifier to conduct, resulting in decrease of generator excitation and increase of wheel motor excitation, thus enhancing the dynamic braking effect to slow the vehicle down and tend to maintain it at substantially the governed speed.

Now assume that the vehicle is traveling on level ground and then starts going up hill. Since there is always more than enough generator excitation available to drive the vehicle at maximum load and speed, the generator will automatically pick up the extra load while maintaining substantially the governed speed.

Now assume that the main controller has been set for maximum speed and that the vehicle has been running at full load, and then it starts down a steep incline. The generator load will, of course be decreased, causing generator output voltage to start to increase, which will result immediately in an increase in the output voltage of the sixth rectifier 357 to cause conduction of the transistor amplifier 291. As hereinbefore mentioned, conduction of the transistor amplifier will result in an immediate decrease in generator excitation which will reduce the generator output voltage, and also will result in an increase in wheel motor excitation, which will increase the generator load and consequently also tend to decrease the generator output voltage. In addition, the wheel motors will tend to speed up, resulting in increased output voltage for the seventh rectifier, tending also to cause conduction of the transistor amplifier 291 and also resulting in decrease of generator excitation and increase of wheel motor excitation, thus increasing the dynamic braking effect to slow down the vehicle.

Now assume that the vehicle is traveling at maximum speed under full load and that it has just topped a hill having an abrupt crest, so that the generator load decreases suddenly and drastically. This condition will immediately cause the output of the sixth rectifier to increase, causing conduction of the transistor amplifier 291 and decreasing the generator excitation so that the generator output voltage will not exceed the predetermined optimum maximum magnitude.

As hereinbefore stated, the maximum wheel motor speed is determined by the setting of variable resistor 401. However, all speeds below maximum are determined by the setting of the auxiliary controller potentiometer 389, which follows the setting of the main controller 151. Thus for each setting of the main controller, there is a corresponding vehicle governed speed. A given setting of main controller 151 will always produce more than sufficient generator excitation to achieve the corresponding governed speed under maximum load conditions. At the same time, a given setting of the main controller 151 provides a setting of the auxiliary controller that will produce the speed limiting action of the output voltage of the seventh rectifier 377 when the wheel motor speed exceeds the corresponding governed speed.

It should be understood that in the embodiment shown, an excess of generator excitation is provided, and the output of the transistor amplifier 291 acts to control this excess excitation in a manner to produce desired results. With this arrangement, the transistor amplifier is normally non-conducting due to bias voltages derived from the reference voltages, and the transistor amplifier becomes conductive only when the output of the sixth or seventh rectifier exceeds its corresponding reference voltage. It would be possible, and within the purview of my invention in some of its aspects, to have the transistor amplifier conducting at all times, so that its input control voltages could either increase or decrease the transistor amplifier output to effect the desired control functions.

The resistance grid arrangement herein disclosed is advantageous in applications where the vehicle is to be operated primarily in the forward direction, since in such applications it permits some simplification, with attendant economies. When the vehicle is moving forward under normal conditions, current is flowing through the series fields 39 of the generators 19, 21, which have small resistance compared to the resistance grids 67, 71 and therefore will conduct most of the generator armature current, with very little current flow through or energy dissipation by the grids. Under dynamic braking conditions, the generator armature currents are reversed, so current flow through the generator series fields 39 is blocked by the diodes 51, 61 and current is forced to flow through the resistance grids 67, 71 allowing much energy dissipation by the grids. Thus also, under dynamic braking conditions the generators 19, 21 become shunt motors which do not have as much power as they would as compound motors, so the generators 19, 21 have reduced capability of driving the internal combustion engines 27, 31 at excessive speeds. Consequently, more energy is dissipated by the grids and less by driving the engines, thus the need for engine overspeed controls may be eliminated.

It will be understood that the showings of specific switches, relays, rectifiers, controllers, direct current voltage sources and the like are schematic only, and may be modified in various ways as will be apparent to those skilled in the art, without departing from the principles of the invention. Thus, the foregoing disclosure and the showings made in the drawings are merely illustrative of the principles of my invention and are not to be interpreted in a limiting sense.

I claim:

1. A control system for an electrically powered vehicle comprising in combination:

(a) a direct current generator having a shunt field;

(b) power means mechanically coupled to said generator for driving same;
(c) means for supplying excitation to said generator shunt field;
(d) one or more direct current electric drive motors each each having a shunt field;
(e) means for supplying excitation to said motor shunt fields;
(f) means responsive to the magnitude of a control signal to simultaneously decrease the generator shunt field excitation and increase the motor shunt field excitation and vice versa;
(g) said generator excitation supply means including a main controller having a range of positions controlling a corresponding range of magnitudes of generator excitation;
(h) means determining the magnitude of said control signal including means for deriving a second signal which is a function of drive motor speed and an auxiliary controller having a range of positions and positioned responsive to the positioning of said main controller, and means applying said second signal in circiut with said auxiliary controller such that the drive motor speed at which said second signal will become effective to affect the magnitude of said control signal is determined by the position of said auxiliary controller.

2. The control system as set forth by claim 1, wherein the means determining the magnitude of said control signal further includes means for deriving a third signal which is a function of the generator output voltage and means applying said third signal such that it determines the magnitude of said control signal when the output voltage of said generator tends to exceed a predetermined optimum maximum and the magnitude of said control signal is not being determined by said second signal.

3. The control system as set forth by claim 1, wherein said second signal is a direct current voltage of constant polarity, and said means determining the magnitude of said control signal includes a direct current reference voltage source, and a resistance element across which a signal which is a function of said control signal is developed and said auxiliary controller is a potentiometer having end terminals and a slider; said end terminals being connected in series with said reference voltage, and said second signal being connected in series with the portion of said auxiliary controller potentiometer that is between said slider and one end terminal and said resistance element, with said second signal in bucking relation to said reference voltage.

4. The control system as set forth by claim 3, wherein the means determining the magnitude of said control signal further includes means for deriving a third signal which is a function of the generator output voltage and means applying said third signal such that it determines the magnitude of said control signal when the output voltage of said generator tends to exceed a predetermined optimum maximum and the magnitude of said control signal is not being determined by said second signal.

5. A control system for an electrically powered vehicle comprising in combination:
(a) a direct current generator having an armature, a shunt field and a series field;
(b) one or more direct current electric drive motors;
(c) first and second main line bus conductors;
(d) means connecting said drive motors to said bus conductors;
(e) means connecting said generator armature and series field in series with a unidirectional conducting device across said bus conductors, with unidirectional conducting device poled to conduct in the direction of generator armature current flow under generating conditions;
(f) a resistance grid connected in parallel with the series combination of said field and said unidirectional conducting device;
(g) and means for shunting said unidirectional conducting device when the vehicle is in the reverse travel condition.

6. A control system for an electrically powered vehicle comprising in combination:
(a) a plurality of direct current generators, each having an armature, a shunt field and a series field;
(b) one or more direct current electric drive motors;
(c) first and second main line bus conductors;
(d) means connecting said drive motors to said bus conductors;
(e) means connecting each said generator armature and series field in series with a unidirectional conducting device across said bus conductors, with unidirectional conducting device poled to conduct in the direction of generator armature current flow under generating conditions;
(f) a resistance grid connected in parallel with the series combination of each said respective series field and unidirectional conducting device.
(g) and means for shunting each said unidirectional conducting device when the vehicle is in the reverse travel condition.

References Cited

UNITED STATES PATENTS

| 3,102,219 | 8/1963 | Le Tourneau | 318—145 |
| 3,417,304 | 12/1968 | Le Tourneau | 318—149 |

ORIS L. RADER, Primary Examiner

K. L. CROSSON, Assistant Examiner

U.S. Cl. X.R.

318—156, 157